United States Patent [19]

Manley et al.

[11] 4,236,546

[45] Dec. 2, 1980

[54] ELECTRONIC BREATHING MIXTURE CONTROL

[75] Inventors: Claude E. Manley, LaPlata; John J. Pennella, Pomfret; Donald J. Deaton, Rison; Alan L. Crandall, Indian Head; James P. Hersey, Bryans Rd., all of Md.

[73] Assignee: The United States of America as represented by the Secretary of the Navy, Washington, D.C.

[21] Appl. No.: 953,510

[22] Filed: Oct. 23, 1978

[51] Int. Cl.$^3$ .......................................... G05D 11/03
[52] U.S. Cl. ........................................ 137/88; 137/93; 128/204.22
[58] Field of Search .................. 137/7, 88, 93; 128/142 R, 142 G, 142.2, 209, 210, 204.22

[56] References Cited

U.S. PATENT DOCUMENTS

| | | | |
|---|---|---|---|
| 3,556,098 | 1/1971 | Kanwisher | 137/93 |
| 3,593,735 | 7/1971 | Reiher | 128/142 |
| 3,675,649 | 7/1972 | Basham et al. | 128/142 |
| 3,727,626 | 4/1973 | Kanwisher et al. | 137/88 |
| 3,794,059 | 2/1974 | Burt, Jr. | 128/142.2 |
| 3,805,590 | 4/1974 | Ringwall et al. | 128/142 |
| 3,957,043 | 5/1976 | Shelby | 137/88 |
| 3,973,562 | 8/1976 | Jansson | 128/205.12 |
| 4,016,876 | 4/1977 | Martin et al. | 128/204.23 |
| 4,056,098 | 11/1977 | Michel et al. | 128/142 R |

Primary Examiner—William R. Cline
Assistant Examiner—H. Jay Spiegel
Attorney, Agent, or Firm—R. S. Sciascia; A. L. Branning; D. A. Lashmit

[57] ABSTRACT

An electronic breathing mixture control system which senses and controls the oxygen component partial pressure of an underwater breathing mixture. Three oxygen sensors disposed within a mix chamber generate voltages proportional to the oxygen partial pressure in the mixture. These voltages are processed and compared with reference voltages using digital logic circuitry. The resulting processed signals control two light emitting diodes warning the user of improper oxygen partial pressure and in addition control a switch that actuates an oxygen valve which either restricts oxygen flow to the mix chamber or allows more oxygen to flow therein.

8 Claims, 4 Drawing Figures

FIG. 3

LEGEND
- X  PRESENCE OF A SENSOR WITHIN SPECIFIED VOLTAGE RANGE
- G  GREEN
- BG  BLINKING GREEN
- BR  BLINKING RED
- ARG  ALTERNATING RED AND GREEN

TRUTH TABLE

| .095 | .065 | .045 | 0 | $A_0$ | $A_1$ | $A_2$ | $A_3$ | LED STATUS | SWITCH STATUS | |
|---|---|---|---|---|---|---|---|---|---|---|
|  |  |  |  | - | 0 | 0 | - | 0 0 0 | f f f | }  |
|  |  |  |  | - | - | 0 | - | 0 0 0 | f f f | LOGIC MALFUNCTION |
|  |  |  |  | - | 0 | - | - | 0 0 0 | f f f |  |
|  |  |  |  | - | - | - | 0 | 0 0 0 | f f f | INDETERMINATE |
|  | X | X | X | - | 0 | 0 | - | A A A / R R G | - | |
| X |  | X | X | - | 0 | 0 | - | A A A / R R G | - | |
| X | X |  | X | - | 0 | 0 | 0 | A A A / R R G G | 0 0 | |
| X | X | X |  | - | 0 | 0 | 0 | A A A / R R G G | 0 0 | |
|  |  | X | X X | 0 | 0 | - | - | B B / R R | - 0 | |
|  | X |  | X X | - | 0 | - | - | B B / R R | - | |
| X |  |  | X X | - | 0 | - | - | B B / G R | - | |
|  | X X | X |  | 0 | 0 | - | 0 | G G | - | |
|  | X | X X |  | 0 | 0 | - | 0 | G G | - | |
| X |  | X X |  | - | 0 | - | 0 | A A / R G | - | |
|  | X X |  | X | - | 0 | 0 | 0 | A / R G | 0 | |
|  | X X | X |  | 0 | 0 | 0 | 0 | G G | 0 0 | |
| X |  | X X |  | 0 | 0 | 0 | 0 | G G | 0 0 | |
| X X |  |  | X | - | - | 0 | 0 | B B G G | 0 0 | |
| X X |  | X |  | - | - | 0 | 0 | B B G G | 0 0 | |
| X X | X |  |  | 0 | - | 0 | 0 | B B G G | 0 0 | |
|  |  | X X X | 0 | 0 | - | - | B B G R | - | |
|  | X X X |  | 0 | 0 | - | 0 | G G G | - | |
| X X X |  |  | 0 | - | 0 | 0 | B G G | 0 0 | |

SENSOR VOLTAGE RANGES

ELECTRONIC BREATHING MIXTURE CONTROL

BACKGROUND OF THE INVENTION

The present invention relates generally to diving apparatus. More specifically, this invention relates to the monitoring and control of the breathing gas mixture used by divers. Even more specifically, this invention relates to the monitoring and control of the oxygen partial pressure within such a breathing mixture.

One of the most important parameters to a diver is the partial pressure of oxygen ($O_2$) in his breathing mixture. Various analog electronic circuits currently used to monitor and control $O_2$ partial pressure have proven to be unreliable due to circuit failures. Such failures occur without warning to the user and the user is therefore left unprotected. The diver continues to use his breathing apparatus without realizing that his $O_2$ partial pressure is no longer being monitored and sometimes discovers a failure too late to compensate for it.

In addition, the analog monitoring circuits in use today are highly magnetic. That is, they generate easily detectable magnetic fields, an undesirable quality in certain military and clandestine uses.

SUMMARY OF THE INVENTION

Accordingly, it is an object of the present invention to control oxygen partial pressure supplied by a closed circuit breathing apparatus.

A further object of the present invention is to maintain oxygen partial pressure at a predetermined level within a predetermined tolerance.

Another object of the present invention is to warn the user if the level of oxygen partial pressure fails to fall within a preselected pressure range.

Still another object of the present invention is to provide a highly reliable oxygen partial pressure monitoring system which warns the user of low power supply voltage, sensor failure, and circuit failures.

Yet another object of the present invention is to provide an oxygen control system that is small in size.

A still further object of the present invention is to provide an oxygen monitoring system that is non-magnetic.

A further object of the present invention is to provide an electronic breathing mixture control having low power requirements so as to permit battery power operation for long intervals of time.

These and other objects of the present invention are attained by providing a system for monitoring the partial pressure of oxygen in a diver's breathing mixture. Three oxygen sensors disposed within the mix chamber generate voltages proportional to the oxygen concentration (partial pressure) within the mixture. Highly redundant logic circuitry compares these generated voltages representing oxygen concentrations with preselected reference levels and generates signals to warn the user and in extreme cases to open or close an oxygen valve to enrich or deplete oxygen concentration. Driver circuits coupled to both the logic circuitry and to light emitting diodes alert the user to the current range of oxygen partial pressure. When oxygen partial pressure is out of a predetermined range, a transistor switch circuit actuates a crystal switch to open or close an oxygen valve. In addition, a highly regulated low power drain power supply is provided which uses a programmable zener diode and a low voltage sensor.

BRIEF DESCRIPTION OF THE DRAWINGS

A more complete understanding of the invention and fuller appreciation of the many attendant advantages thereof will be readily apparent as the invention becomes better understood by reference to the following detailed description with the appended claims, when considered in conjunction with the accompanying drawings, wherein:

FIG. 3 is a truth table illustrating all possible combinations for logic signals generated by the sensing logic circuit of FIG. 1.

DESCRIPTION OF THE PREFERRED EMBODIMENTS

Figure 1:
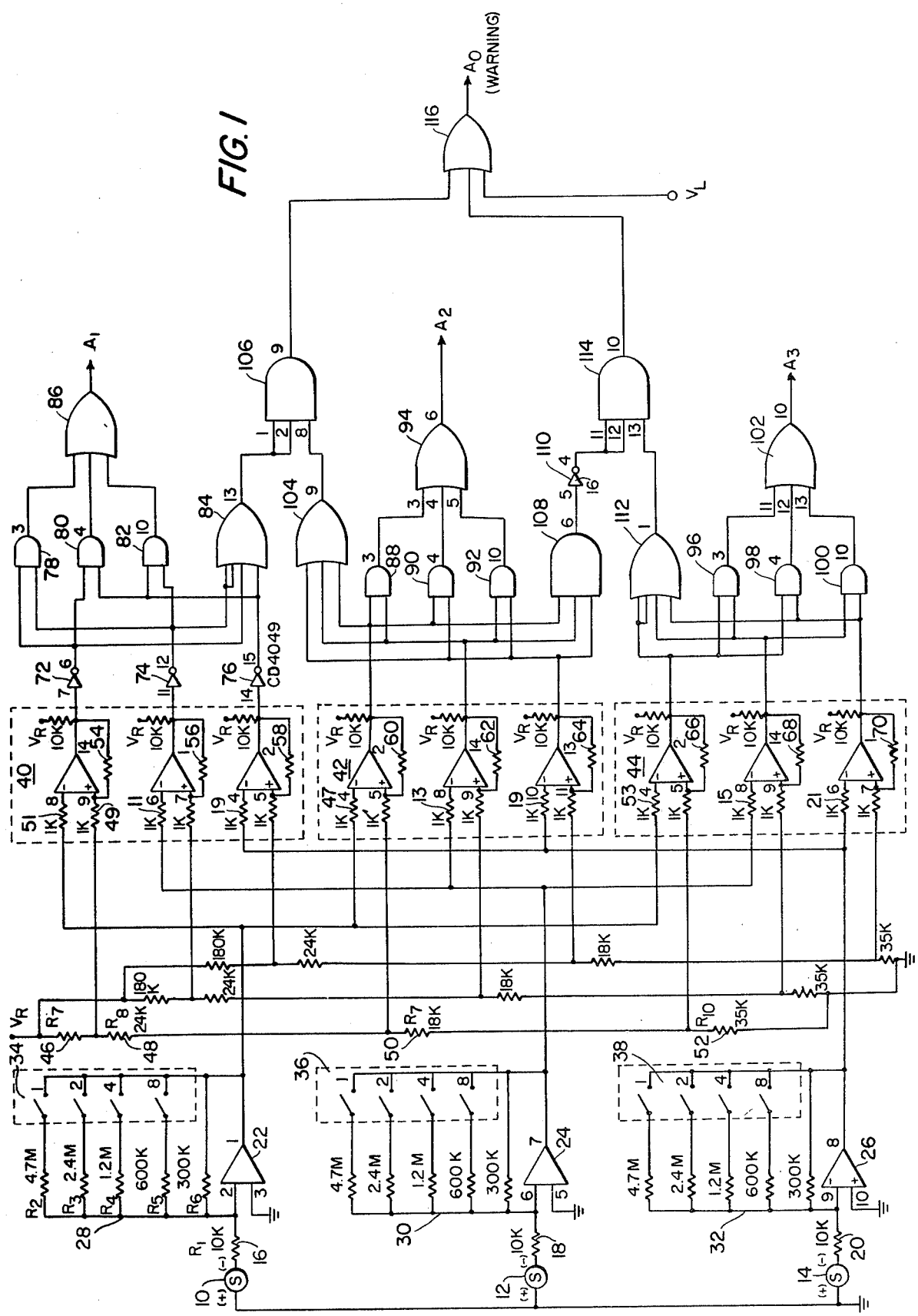
FIG. 1 is a schematic diagram of the sensing/logic circuit of the electronic breathing mixture control according to the present invention.

The electronic breathing mixture control according to the present invention is designed to detect and distinguish among four ranges of $O_2$ partial pressures. Range 1 is defined to be an $O_2$ partial pressure exceeding 0.95 atm. Range 2 is defined to be an $O_2$ partial pressure between 0.95 atm. and 0.65 atm. Range 3 is defined to be an $O_2$ partial pressure between 0.65 atm. and 0.45 atm., and range 4 is defined to be an $O_2$ partial pressure that is less than 0.45 atm. It is both beneficial and desirable to maintain a level of $O_2$ partial pressure in range 2 or range 3, and therefore, 0.65 atm. of $O_2$ partial pressure was chosen as a control point. If the $O_2$ partial pressure drops below 0.65 atm., the electronic breathing mixture control opens a valve to allow $O_2$ to enter and enrich a breathing mixture, thus increasing the $O_2$ partial pressure. If the $O_2$ partial pressure climbs above 0.65 atm., the same valve closes thereby shutting off $O_2$ supply. The user is informed of the $O_2$ partial pressure range by the lighting of two light emitting diodes (LEDs), one green and one red. When the $O_2$ partial pressure is in ranges 2 or 3, the green LED lights. When the $O_2$ partial pressure climbs into range 1, the green LED blinks. If $O_2$ partial pressure falls into range 4, the red LED blinks. Various circuit malfunctions cause the LED to alternate red and green while other malfunctions turn the display off completely.

The electronic breathing mixture control according to the present invention includes two major subsystems: a sensor/amplifier circuit, and a logic/control circuit.

Referring now to FIG. 1, which is a detailed schematic diagram of the sensing/logic circuit, oxygen partial pressure is sensed by three oxygen sensors 10, 12, 14. Each of sensors 10, 12, 14 produces a voltage between two output terminals that is proportional to $O_2$ partial pressure. The more positive voltage output terminal of each of sensors 10, 12, and 14 is grounded and the more negative potential output terminal of each sensor is coupled through a 10k ohm resistor 16, 18 and 20 respectively to the inverting input of an operational amplifier 22, 24 and 26. The non-inverting input of each of operational amplifiers 22, 24, and 26 is grounded. Resistive ladder networks 28, 30 and 32 couple the respective outputs of amplifiers 22, 24 and 26 to their inverting inputs. Hexadecimal switches 34, 36 and 38 allow the user to select various combinations of resistors from ladders 28, 30 and 32 so as to control the gain of each of operational amplifiers 22, 24 and 26 respectively. The small numerals within the hexadecimal switch block indicate switch position settings. The values of resistors in ladders 28, 30, and 32 are chosen such that the average gain for switch position 8 is −20. By varying switch positions, the gain of amplifiers 22, 24 and 26 can be easily changed for calibration.

The amplified signal from sensor 10 is coupled to three separate comparator circuits 40, 42 and 44. Each of these comparator circuits utilizes a MC3302P chip comprising three separate comparators. The amplified output of sensor 10 is coupled to pin 8 of comparator circuit 40, pin 4 of comparator circuit 42, and pin 4 of comparator circuit 44. Comparator circuit 40 compares the voltage from amplifier 22 with a 1.9 volt reference voltage. This 1.9 volt reference is established by a resistive series ladder, having voltage taps at resistor junctions, including resistors 46, 48, 50 and 52 coupled in series from a regulated power supply voltage $V_r$ to ground, where resistor 46 is coupled to regulated supply voltage $V_r$ and resistor 52 is coupled to ground. Values for resistors 46 to 52 are chosen so that a tap off at the junction of resistors 46 and 48 yields a 1.9 volt reference for comparator 40. This 1.9 volt reference tap off is coupled through a 1k ohm resistor 49 to pin 9 of comparator 40. The amplified output signal of amplifier 22 is coupled through a 1k ohm resistor 51 to pin 8 of comparator 40. When the voltage from amplifier 22 is greater than the 1.9 volt reference voltage, the output at pin 14 of comparator circuit 40 is a low logic level. When the output from amplifier 22 is less than the 1.9 volt reference voltage, the output at pin 14 of comparator 40 is a high logic level. The output of amplifier 22 is also coupled through 1k ohm resistors 47 and 53 to input pins 4 of comparators 42 and 44. These comparators 42 and 44 function exactly the same as comparator 40, however, comparator 42 establishes a reference voltage of 1.3 volts by tapping the reference voltage resistive ladder between resistor 48 and 50 and comparator circuit 44 establishes a reference voltage of 0.9 volts by tapping the voltage reference resistive ladder between resistors 50 and 52. Hysteresis resistors 54 to 70 are coupled from the output to the non-inverting input of each of the comparators of comparator circuits 40 to 44. Each of these hysteresis resistors have a value of 5.1 meg ohms and prevents undesirable oscillation from occurring within these comparators.

In the same manner that the output of amplifier 22 was compared with reference level signals in comparators 40, 42 and 44, the outputs of amplifiers 24 and 26, corresponding to the sensor signal from sensors 12 and 14 respectively, are coupled to other inputs of these same comparators. Additional resistive dividers provide reference voltages for comparison. The output of amplifier 24, corresponding to the signal from sensor 12, is coupled through 1K ohm resistors 11, 13, and 15 to input pin 6 of comparator circuit 40, to input pin 8 of comparator circuit 42 and to input pin 8 of comparator circuit 44. The output of amplifier 26, corresponding to the signal from sensor 14, is likewise coupled through 1K ohm resistors 17, 19 and 21 to input pin 4 of comparator circuit 40, to input pin 10 of comparator circuit 42 and to input 6 of comparator circuit 44. In this manner, each of the amplified sensor signals is compared with 1.9 volt, 1.3 volt, and 0.9 volt reference signals. The three outputs of comparator circuit 40 at pins 7, 11, and 14 are inverted by inverters 72, 74 and 76, producing inverted outputs at pins 6, 12, and 15 respectively. The output signal at inverter 72, pin 6 corresponds to the comparison of the amplified signal from oxygen sensor 10 with the 1.9 volt reference voltage. The signal at inverter 74, pin 12 corresponds to the comparison of the amplified signal from oxygen sensor 12 with the 1.9 volt reference voltage and the output of inverter 76, pin 15 corresponds to the comparison of the amplified signal from sensor 14 with the 1.9 volt reference voltage. These inverter comparison signals are logic gated for further comparison and to provide redundancy.

Three AND gates 78, 80, and 82 and two OR gates 84 and 86 process these inverted comparison signals. The signal from inverter 72 is coupled to one of two inputs of gate 78, one of two inputs of gate 80, and to one of four inputs of gate 84. The output signal from inverter 74 is coupled to the second input of gate 78, to one of two inputs of gate 82, and to two inputs of gate 84. The output signal from inverter 76 is coupled to the second input of gate 80, to the second input of gate 82 and to the fourth input of gate 84. The outputs of gates 78, 80 and 82 are coupled to the three inputs of gate 86 to produce an output $A_1$. Signal $A_1$ is a logic level high when any two of the outputs of comparator circuit 40 are logic level low. Therefore when signal $A_1$ is logic level high at least two of sensors 10, 12 and 14 are detecting an $O_2$ partial pressure in range 1 (greater than 0.95 atm.). In a similar fashion, AND gates 88, 90 and 92 and OR gate 94 logically combine the signals from comparator circuit 42 to produce an output signal $A_2$ which will be a logic level high when any two of sensors 10, 12 and 14 detect an $O_2$ partial pressure below 0.65 atm. AND gates 96, 98 and 100 and OR gate 102 logically combine the outputs from comparator circuit 44 to produce an output signal $A_3$ that is a logic level high when any two sensors 10, 12 and 14 detect a partial pressure in range 4 (below 0.45 atm.). An OR gate 104 having three inputs coupled to the outputs of comparator circuit 42 produces a signal that is subsequently combined with the output of OR gate 84. The signals produced by the combined actions of gates 84 and 104 are coupled to the inputs of an AND gate 106 producing a logic level signal related to the combination of the signals from all three sensors. The signals from comparator circuit 42 are coupled to an AND gate 108 which is in turn coupled to an inverter 110 to produce a signal related to the combination of the signal from all three sensors as processed by comparator circuit 42. The three outputs from comparator circuit 44 are combined in an OR gate 112 to produce a signal related to the combination of all three sensors. The output of OR gate 112 is combined with the signal from inverter 110 in an AND gate 114. The output of AND gates 106 and 114 are coupled to two of the three inputs of an OR gate 116. The third input of OR gate 116 is tied to a low battery voltage warning signal, $V_L$ (see FIG. 4). Gate 116 produces a signal $A_o$ which is a warning signal.

When signal $A_1$ is high, at least two of sensors 10, 12, and 14 are detecting an $O_2$ partial pressure in range 1 (above 0.95 atm.). In similar fashion, $A_2$ is high when any two of sensors 10, 12 and 14 detect a partial pressure below 0.65 atm. $A_3$ is a logical high when any two sensors 10, 12 and 14 detect a partial pressure in range 4 (below 0.45 atm.). Note at least two sensors must agree. If the third sensor is off by no more than 1 range, it is acceptable. But, if the third sensor disagrees by two or three ranges, or if all three sensors disagree, an impermissible condition exists and $A_o$ will go to a logic level high as a warning. All possible combinations of sensor output and the responses of $A_o$, $A_1$, $A_2$ and $A_3$ are shown in a truth table illustrated as FIG. 3.

Referring now to FIG. 3 which is a truth table summarizing the status of the various indicators, "X" marks indicate the output of one of sensors 10, 12 and 14 within a specified voltage range. Note that the total number of "X" marks in any vertical column is three accounting for all three sensors. All possible sensor status combinations are listed. Below these "X" marks, the status of signals $A_o$, $A_1$, $A_2$, and $A_3$ are listed. A "0" corresponds to logic level "low" and a "1" corresponds to logic level "high." Looking further down the table, the status of the LEDs is detailed. On the bottom horizontal line of the table, the status of a switch 120 valving the $O_2$ supply to the mix chamber is indicated, an "0" indicated "closed" and a "1" indicating "open."

Figures 2, 4:
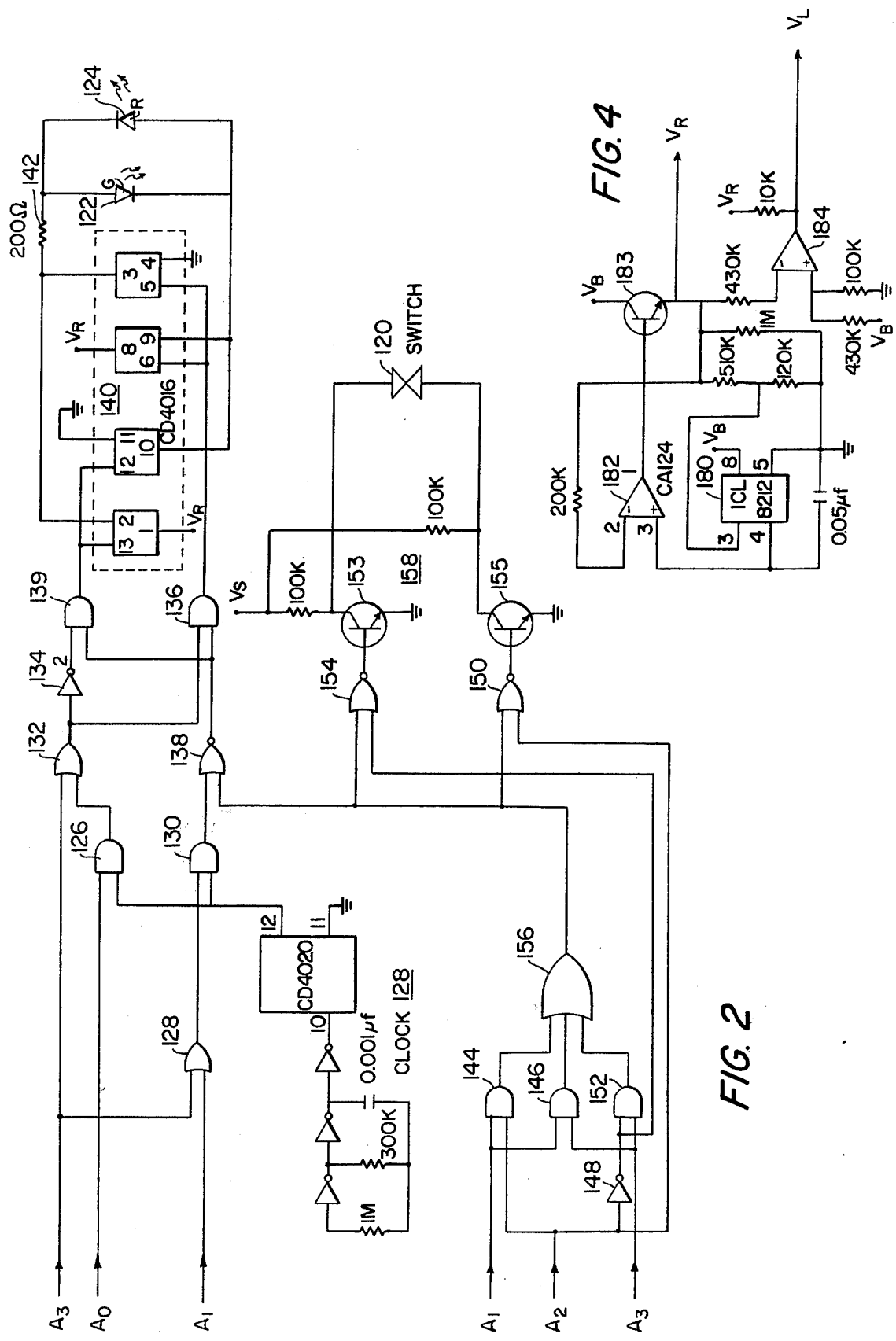
FIG. 2 is a schematic diagram of the switch control and LED drive circuit of the electronic breathing mixture according to the present invention.
FIG. 4 is a power supply regulator circuit suitable for powering from a battery supply the electronic breathing mixture control according to the present invention.

Referring now to FIG. 2, which is a detailed schematic diagram of the switch control and LED drive circuit of the electronic breathing mixture control, incoming signals $A_o$, $A_1$, $A_2$, and $A_3$ from the sensing logic circuit control the operation of a switch 120, a green light emitting diode (LED) 122 and a red light emitting diode (LED) 124. Signal $A_o$ is coupled directly to one input of a two input AND gate 126. The second input of gate 126 is coupled to a clock circuit 128 supplying a one (1) Hz clock signal. Signal $A_1$ is coupled to one input of a two input OR gate 128 and signal $A_3$ is coupled to the second input of gate 128. The output of gate 128 is coupled to one of two inputs of an AND gate 130. The second input of gate 130 is coupled to clock circuit 128 and is supplied with a 1 Hz signal therefrom. Signal $A_3$ is, in addition, coupled to one of two inputs of an OR gate 132. The second input of gate 132 is coupled to the output of gate 126. The output of gate 132 is coupled both to the input of an inverter 134 and to one of two inputs of an AND gate 136. The output of gate 130 is coupled to one of two inputs of an OR gate 138. The output of gate 138 is coupled to the second input of input 136 and to one of two inputs of an AND gate 139. The second input of AND gate 139 is coupled to the output of inverter 134. The outputs of gates 136 and 139 are coupled respectively to input pins 6 and 12 of an electronic gate 140 (CD4016) which drives LEDs 122 (green) and 124 (red). A resistor 142 couples pins 2 and 3 of gate 140 to the anode of LED 122 and to the cathode of LED 124. The cathode of LED 122 and the anode of gate 124 are tied to both pins 9 and 10 of gate 140. Pins 5 and 6 of gate 140 are tied together as are pins 2 and 3. Power is supplied to pin 1 and pin 8 of gate 140, and pins 4 and 11 are grounded.

Signal $A_1$ is also coupled to one of two input pins of two AND gates 144 and 146. Signal $A_2$ is coupled to the second input of gate 144, to an inverter 148, and to one of two inputs of a NOR gate 150. Signal $A_3$ is coupled to the second input of gate 146 and to one of two inputs of an AND gate 152. The second input of AND gate 152 is coupled to the output of inverter 148 and to one of two inputs of a NOR gate 154. The outputs of gates 144, 146 and 152 are coupled to three inputs of an OR gate 156 the output of which is coupled to the second input of gate 150, the second input of gate 154, and the second input of gate 138. The outputs of gate 150 and 154 are coupled respectively to the bases of two transistors 155 and 153 coupled to form a switching circuit 158. Switch 120 is coupled across the two collectors of the transistors of switching circuit 158.

In this manner, when the output of gate 139 is a logic high, green LED 122 will light. When the output of gate 136 is logic level high, red LED 124 will light. The 1 Hz signal from clock circuit 128 is used to drive the LEDs according to the state of $A_o$, $A_1$ and $A_3$. Blinking green occurs if $A_1$ is "high." Solid green occurs if $A_o$, $A_1$, and $A_3$ are "low." Blinking red occurs if $A_3$ is "high." Note that signal $A_1$ should not be high at the same time $A_2$ or $A_3$ are high because the $O_2$ partial pressure can not be in ranges 1 and 3 or ranges 1 and 4 simultaneously. If such a logic malfunction occurs indicating these impossible range combinations, the output of gate 156 will become a logic level high shutting off the display.

Switching circuit 158 controls crystal switch 120. When $A_2$ is a logic level high, transistor 153 is on and transistor 155 is off. This electrical configuration grounds one side of switch 120 and supplies a voltage to the other side. When $A_2$ becomes a logic level low, transistor 153 goes off and transistor 155 goes on thereby reversing the polarity of switch 120. Switch 120 actuates a valve allowing $O_2$ to enter the system when $A_2$ is a logic level high and shuts off the $O_2$ supply when $A_2$ is a logic level low. Note that if a logic malfunction occurs indicating an impossible range combination, transistors 153 and 155 will both turn off, disabling crystal switch 120. Again, the truth table detailed in FIG. 3 summarizes all possible combinations of sensor outputs and the corresponding outputs of LEDs 122 and 124 and crystal switch 120.

Referring now to FIG. 4, there is schematically detailed a power supply regulator suitable for operation of the electronic breathing mixture control according to the present invention. Of course, this particular schematic is but one of many possible suitable for operating the invention. In order to provide the electronic breathing mixture control with the capability of operating from batteries, a voltage regulator which uses as little power as possible was required. A programmable zener diode 180 was selected for reference voltage control because of its low power drain. A buffer stage 182 isolates zener 180 from its load. Buffer 182 drives the base of a transistor stage 183. The collector of transistor 183 is coupled to power supply voltage $V_b$ and reference voltage $V_r$ is produced at its emitter. A low voltage detector 184 is coupled to the emitter of transistor 183 to sense battery failure. If $V_b$ drops below 7.8 volts a signal $V_L$ is produced as a logic level high signal. $V_L$, coupled to gate 116, causes warning signal $A_o$ to go high.

Because voltage output varies from sensor to sensor, the system must be calibrated prior to each use of the electronic breathing mixture control. This calibration is accomplished by the following procedure: (1) Turn on the electronic breathing mixture control. (2) Cause 100% $O_2$ to flow into the mixing chamber containing sensors 10, 12 and 14. (3) Set hexadecimal switches 34, 36 and 38 to position zero. This should cause green LED 122 to blink. (4) Set hexadecimal switch 38 to position 15 and then advance hexadecimal switch 34 one step at a time until LED 122 ceases to blink and shines continuously. Hexadecimal switch 34 is now calibrated. Its position should be marked and retained. (5) Set hexadecimal switch 34 back to position zero. LED 122 (green) should be blinking. Advance hexadecimal switch 30 one step at a time until this green LED 122 begins to shine continously. This completes calibration for hexadecimal switch 36 and its position should be noted and retained. (6) Set hexadecimal switch 36 to position 15 and hexadecimal switch 38 to position 0. Green LED 122 should be blinking. Advance hexadecimal switch 38 one step at a time until LED 122 shines continously green. This is the correct calibration position for hexadecimal switch 38. (7) Now reset switches 34 and 36 to the previously noted correctly calibrated position. Calibrated in this manner the electronic breathing mixture control should function as previously outlined.

It is apparent that there has been provided an electronic breathing mixture control that will control the oxygen partial pressure supplied by a closed circuit breathing apparatus. The device maintains $O_2$ partial pressure of 0.65 atm. within a 0.05 atm. pressure tolerance. In addition, LEDs 122 and 124 warn the user if $O_2$ partial pressure goes outside the range 0.45 to 0.95 atm. pressure. A warning circuit is provided that is highly reliable and warns the user of low battery voltage, sensor failure, or circuit failure. Its circuit structure allows it to be produced in a small nonmagnetic package having extremely low power requirements.

Obviously other embodiments and modifications of the present invention will readily come to those of ordinary skill in the art having the benefit of the teachings presented in the foregoing description and drawings. It is, therefore, to be understood that this invention is not to be limited thereto and that said modifications and embodiments are intended to be included within the scope of the appended claims.

What is claimed and desired to be secured by Letters Patent of the United States is:

1. An electronic breathing mixture control system comprising:
    a first gas source;
    a gas mix chamber containing a multiple gas mixture including said first gas;
    multiple gas sensors disposed within said gas mixture chamber wherein said gas sensors are responsive to said first gas;
    amplifiers coupled to each of said first gas sensors for producing signals proportional to the partial pressure of said first gas within said gas mix chamber;
    comparator means coupled to said amplifiers for determining whether said amplified sensor signals fall within predetermined ranges corresponding to ranges of partial pressure of said first gas;
    first logic means coupled to said comparator means for producing a first set of logic signals, wherein a selected one of said first logic signals is generated whenever a predetermined number of said amplified sensor signals simultaneously fall within a selected one of said ranges;
    second logic means coupled to said comparator means for producing a second logic signal whenever any one of said amplified sensor signals falls within a range different from that of any one of said other amplified sensor signals by more than a selected number of ranges;
    third logic means coupled to said first and said second logic means for producing a third set of logic signals wherein said third set of logic signals is responsive to selected combinations of said first and said second sets of logic signals, thereby determining whether a valid logic condition exists and, if so, which of said predetermined ranges of partial pressure of said first gas is present in said gas mix chamber;
    indicator means coupled to said third logic means for indicating the status thereof; and
    valve means coupled to said third logic means for allowing communication between said first gas source and said gas mix chamber, whereby said valve means is opened and closed responsive to whether said first gas partial pressure is less than or greater than a predetermined level.

2. The system of claim 1, further including:
    voltage sensor means coupled to said second logic means for producing a signal whenever the system voltage falls below a predetermined level.

3. The system of claim 2 wherein three gas sensors are disposed within said gas mix chamber.

4. The system of claim 3 having N predetermined ranges wherein said comparator means comprises:
    N sets of comparators, each corresponding to one of said predetermined ranges, wherein each of said sets of comparators comprises:
    three differential amplifiers each having two inputs and an output wherein said first input is coupled to one of said gas sensor amplifiers and said second input is coupled to a reference voltage, said reference voltage being proportional to one limit of a predetermined range of first gas partial pressures, and wherein an inverter is coupled to each of said outputs of said differential amplifiers when a particular set of said comparators is configured to determine a lower limit of said predetermined range.

5. The system of claim 4 wherein said first logic means comprises:
    N sets of first logic gates wherein one set of said first logic gates is coupled to each of said sets of comparators, and wherein each of said sets of first logic gates comprises:
    three AND gates each having two inputs and an output wherein said inputs of each AND gate are coupled to two of said three differential amplifiers, and
    an OR gate having three inputs and an output wherein each of said OR gate inputs is coupled to said output of one of said AND gates, and wherein said OR gate output is one logic signal in said first set of logic signals.

6. The system of claim 5 wherein said second logic means comprises:
    N−1 sets of second logic gates wherein each of said sets of second logic gates is coupled to two of said sets of comparators corresponding to two adjacent predetermined ranges, and wherein each of said sets of second logic gates comprises:
    a first OR gate having three inputs and an output wherein each of said inputs is coupled to said output of one of said differential amplifiers in one set of said comparators;
    a second OR gate having three inputs and an output wherein each of said second OR gate inputs is coupled to said output of one of said differential amplifiers in the other set of said comparators; and
    an AND gate having two inputs and an output wherein one of said AND gate inputs is coupled to said output of said first OR gate and said other AND gate input is coupled to said output of said second OR gate; and
    a combining OR gate having N inputs and an output wherein each of said first N−1 inputs is coupled to one of said outputs of said second logic means AND gates and said Nth input is coupled to said voltage sensor means, said output of said combining OR gate being said second logic signal.

7. The system of claim 6 wherein said third logic means includes a logic error detector comprising:
N error detector AND gates corresponding to N sets of first logic gates, each of said error detector AND gates having two inputs and an output wherein said inputs are coupled to two of said first logic OR gate outputs, and wherein said output of one of said first logic OR gates is coupled to an error detector inverter to provide a logic signal output to open said valve means whenever said first gas partial pressure is less than a predetermined level; and
an error detector OR gate having N inputs and an output wherein said inputs are coupled to each of said N error detector AND gate outputs, said output of said error detector OR gate being a logic error signal indicating an impermissible condition in said first logic means.

8. The system of claim 7 wherein said valve means comprises:
a first NOR gate having two inputs and an output wherein said first input of said first NOR gate is coupled to said output of said logic error detector OR gate and said second input of said first NOR gate is coupled to said output of one of said first logic OR gates responsive to said predetermined level of first gas partial pressure;
a second NOR gate having two inputs and an output wherein said first input of said second NOR gate is coupled to said output of said logic error detector OR gate and said second input of said second NOR gate is coupled to said output of said error detector inverter;
a first transistor switch having an input and an output wherein said input is coupled to said output of said first NOR gate;
a second transistor switch having an input and an output wherein said input is coupled to said output of said second NOR gate; and
a valve having an OPEN control input and a CLOSE control input wherein said OPEN control input is coupled to said output of said first transistor switch and said CLOSE control input is coupled to said output of said second transistor switch, thereby opening said valve whenever said first gas partial pressure is below said predetermined level and closing said valve whenever said first gas partial pressure is above said predetermined level.

* * * * *